(12) United States Patent
Doyle

(10) Patent No.: US 8,577,590 B2
(45) Date of Patent: Nov. 5, 2013

(54) SCALABLE GEOFENCES

(75) Inventor: Thomas Francis Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 12/615,066

(22) Filed: Nov. 9, 2009

(65) Prior Publication Data
US 2011/0112768 A1 May 12, 2011

(51) Int. Cl.
*H04W 4/02* (2009.01)
*G09B 29/00* (2006.01)

(52) U.S. Cl.
CPC ............ *H04W 4/021* (2013.01); *G09B 29/007* (2013.01)
USPC ........................... 701/300; 342/450; 342/451

(58) Field of Classification Search
USPC ............ 701/300, 409, 450, 461; 340/286.14, 340/539.1, 539.2; 342/450, 451, 458
IPC ........................... G01S 3/02,19/00; G06F 17/00
See application file for complete search history.

(56) References Cited

U.S. PATENT DOCUMENTS

| | | | |
|---|---|---|---|
| 7,324,666 B2 * | 1/2008 | Zoken et al. | 382/113 |
| 2006/0200305 A1 * | 9/2006 | Sheha et al. | 701/200 |
| 2008/0162034 A1 | 7/2008 | Breen | |
| 2008/0174485 A1 | 7/2008 | Carani et al. | |
| 2009/0112474 A1 * | 4/2009 | Chakrapani et al. | 702/5 |

FOREIGN PATENT DOCUMENTS

WO   WO2006096773 A2   9/2006

OTHER PUBLICATIONS

International Search Report and Written Opinion—PCT/US2010/056043, International Search Authority—European Patent Office—Mar. 21, 2011.

* cited by examiner

*Primary Examiner* — James P Trammell
*Assistant Examiner* — Todd Melton
(74) *Attorney, Agent, or Firm* — Shyam K. Parekh; Mary A. Fales

(57) ABSTRACT

The subject matter disclosed herein relates to location-based tracking using geofences.

37 Claims, 7 Drawing Sheets

SCALABLE GEOFENCES

BACKGROUND

1. Field

The subject matter disclosed herein relates to location-based tracking using geofences.

2. Information

Location-based applications involving "geofences" have dramatically increased in popularity in recent years, along with an increased popularity of satellite positioning systems (SPSs). A geofence may be implemented by establishing a virtual perimeter of a geographic area for use with a location-based service, so that if a tracked device enters or exits such an area a notification may be generated. Such notification may include information about the location of the geofence-based device that is transmitted to a mobile telephone or an email account, for example. A geofence may be used while tracking a geofence-based device being carried by a delivery truck, a car, a child, and so on. A geofence application, for example, may evaluate whether such a tracked device is inside or outside a geofence.

Implementation of geofences for device tracking is increasingly becoming a fundamental feature of many location-based applications. Such applications attempt to establish a geofence that accurately corresponds to a region of interest. For example, if a boundary of a school does not reasonably match a geofence established for the school, then detection of a child leaving the school may lead to a false alarm, or an actual departure from the school may not be detected.

An application may establish a geofence by obtaining coordinates of a region of interest and then assuming a boundary of a standard size and shape associated with the region of interest. An application may also establish a geofence based, at least in part, upon assumptions regarding dimensions of such particular regions of interest. Alternatively, a geofence may be established manually by allowing a user to "draw" a geofence on a map. Another approach to establishing a geofence includes a process whereby a user edits to improve a geofence created by an application.

BRIEF DESCRIPTION OF THE FIGURES

Non-limiting and non-exhaustive features will be described with reference to the following figures, wherein like reference numerals refer to like parts throughout the various figures.

SUMMARY

In one particular implementation, a method may comprise processing electronic signals on a special purpose computing device to maintain signals representative of information regarding a plurality of geophysical entity categories in a memory; processing electronic signals on the special purpose computing device to approximate one or more physical features of a geophysical entity among the geophysical entity categories; and processing electronic signals on the special purpose computing device to determine boundaries of a geofence based, at least in part, on the physical features of the geophysical entity. It should be understood, however, that this is merely an example implementation and that claimed subject matter is not limited to this particular implementation.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Application-based methods used for establishing geofences may yield predictable results, but such geofences of standard size/shape may not accurately represent actual regions. Accordingly, there continues to be a desire to conveniently create geofences that more accurately represent actual regions with which they are associated.

Figure 1:
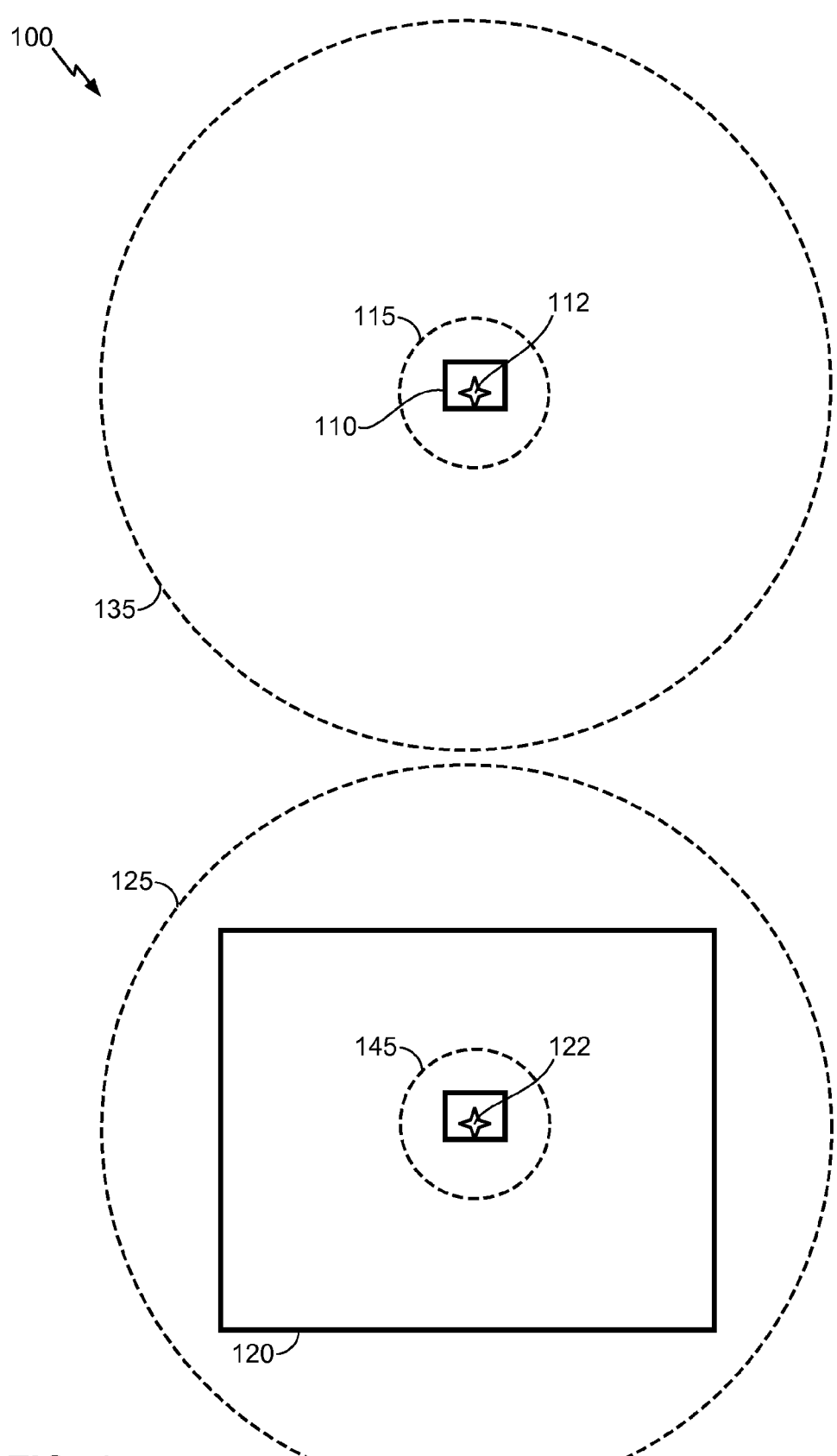
FIG. 1 is a schematic diagram representing a map showing geophysical entities and associated geofences, according to an implementation.

FIG. 1 is a schematic diagram representing a map 100 showing geophysical entities and associated geofences, according to an implementation. Here, "geophysical entity" refers to an entity that may be identified via a map or similar type of information. Such a geophysical entity may comprise a road, highway, house, building, river, and/or mountain, just to name a few examples. Illustrating a particular example, a single-family residence 110 is shown to scale in comparison to an apartment building 120. A geofence may be defined as a boundary that surrounds a point, known as a geopoint, on a geographical surface. For example, a geopoint 112 may be established within single-family residence 110. Subsequently, a geofence 115 or 135 may be defined for geopoint 112. Compared to geofence 135, geofence 115 may result in improved tracking of a mobile device (e.g., cellular phone, PDA, GPS device, and so on) since geofence 115 more closely matches the size of single-family residence 110. For example, a child being tracked by a location-based service may be within geofence 135 while being far outside single-family residence 110, perhaps even in a street or another residence. On the other hand, if a child is within geofence 115, then it is more likely that the child is also within single-family residence 110.

Similarly, a geofence 125 or 145 may be defined for geopoint 122, established within apartment building 120. Compared to using geofence 145, using geofence 125 may result in improved tracking of a mobile device since geofence 125 more closely matches the larger size of apartment building 120. For example, a child being tracked by a location-based service may be outside geofence 145 while continuing to be well inside apartment building 120. On the other hand, if a child is outside geofence 125, then it is more likely that the child is also outside apartment building 120. Thus, a one-size-fits-all approach to choosing a geofence size may undermine efficiency and/or accuracy of location-based tracking services utilizing geofences. Accordingly, once a geopoint is established or determined for a geophysical entity, such as single-family residence 110, it may be beneficial to judiciously select boundaries of a geofence that closely match the size and/or shape of the geophysical entity.

Figure 2:
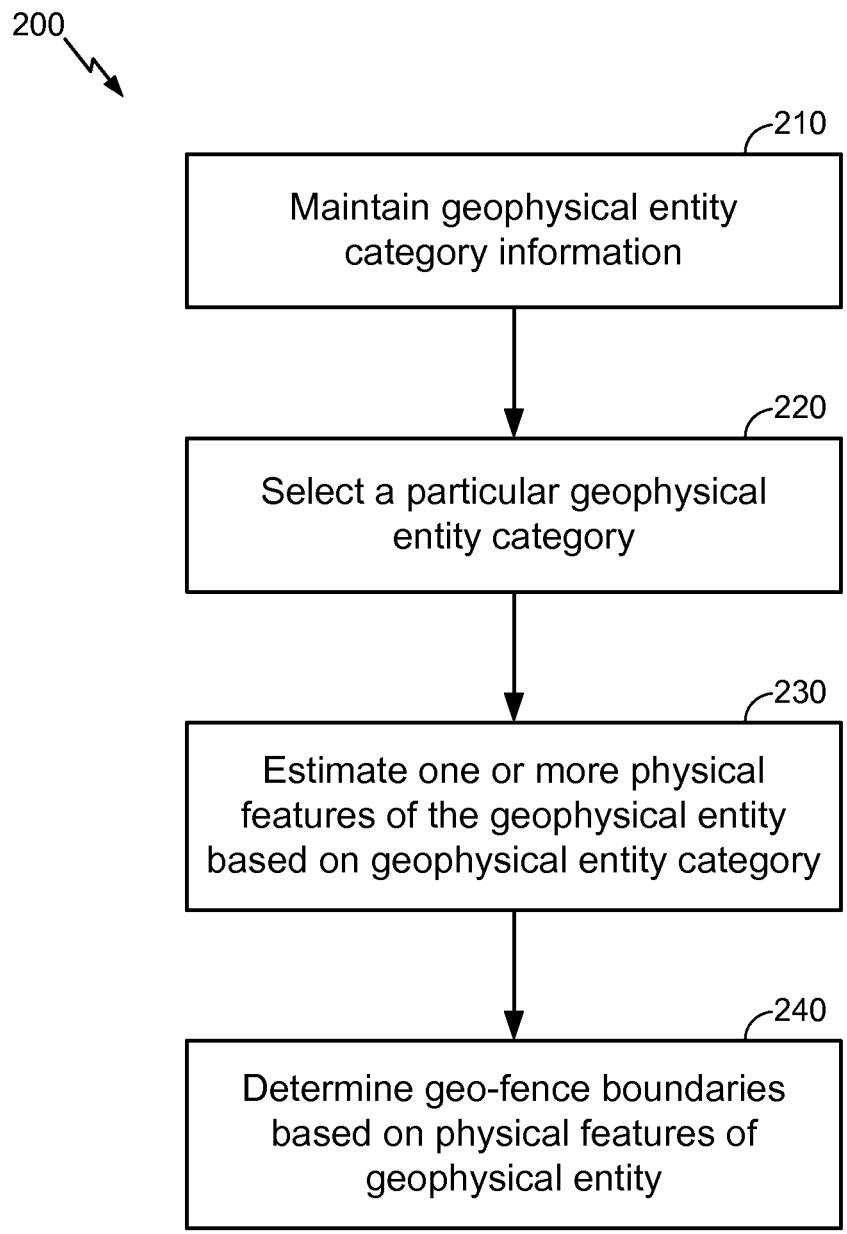
FIG. 2 is a flow diagram of a process for determining a geofence, according to an implementation.

FIG. 2 is a flow diagram of a process 200 for determining boundaries of a geofence, according to an implementation. In such a process, geofence boundaries may be determined by selecting a class or category among a library of categories of geophysical entities that closely matches that of the geophysical entity. Such categories may comprise single-family residences, apartment buildings, schools, airports, factories, shopping malls, parks, hospitals, and/or truck stops, just to name a few examples. Such a category may correspond to typical physical features, such as size and shape, of typical geophysical entities of that category. For example, a medium-sized single-family residence category may correspond to a geofence that is square-shaped and fifteen meters per side, while a school category may correspond to a geofence that is square-shaped and three-hundred meters per side. At block 210, a plurality of such geophysical entity categories may be maintained in a memory of a mobile device and/or a base station in communication with the mobile device. At block 220, a particular category among the geophysical entity categories may be selected to be associated with a particular geophysical entity.

In one particular implementation, such a selection may be made by a user operating a mobile device, for example, such as a mobile phone executing instructions for one or more location-based applications. For example, a mobile phone user may choose to mark (establish) a geopoint at a location of a particular geophysical entity of interest, after which the user may be presented with a menu from which to select a category of geophysical entities that most closely matches that of the particular geophysical entity of interest. For example, if the user established a geopoint at a shopping mall, then the user may select a "shopping mall" category of geophysical entities. As a result, a geofence, having a size and/or shape that may substantially match that of a typical shopping mall, may be determined. Thus, estimating or approximating one or more physical features of a geophysical entity may be based, at least in part, on such an associated category.

In another particular implementation, selecting a particular category among a menu of geophysical entity categories may be based, at least in part, on one or more map attributes. Information regarding map attributes and associated maps may be maintained in a memory at a mobile device, for example. Such attributes may comprise zoning, area type, area category, and/or geophysical features, just to name a few examples. Zoning may further include residential zoning, high-density residential zoning, business and/or commercial zoning, and/or rural zoning; area type/category may further include urban, city, park, and/or agricultural; geophysical features may further include topography, such as whether an area is relatively smooth or hilly, for example. Of course, such a list of map attributes is merely a non-exhaustive list of examples and claimed subject matter is not so limited.

Accordingly, one or more map attributes may be considered for selecting a geophysical entity category for a geopoint. For example, if a geopoint is located in residential zoning, then a "residential" category may be selected for the geopoint. Such a selection may be made based, at least in part, on user input or automatically without user input. For another example, if a geopoint is located in a park, then a "park" category, which may correspond to a relatively large geofence compared to that of a residential category, may be selected for the geopoint. If user input is employed, any such input may be sufficiently structured in format and, in one implementation, validated so that errors may be reduced. Such structure and/or validation may be particularly useful for a relatively large scale geofence. For example, a user may be presented with multiple choices in a list, where the number of choices may be sufficiently limited and relatively easy to distinguish from one another so that the likelihood of user error in selection of such choices is relatively small. In one particular example, a user selecting a single family home in an area that is zoned for heavy industry may likely be an invalid selection. Thus, such a selection may initiate an error message for the user, though claimed matter is not so limited.

Continuing at block 230 shown in FIG. 2, one or more physical features of a particular geophysical entity may be estimated based, at least in part, on a selected geophysical entity category. Such physical features may comprise size and/or shape, for example. At block 240, geofence boundaries may then be determined based, at least in part, on approximated physical features of a geophysical entity. Of course, such details describing process 200, as well as process 200 itself, are merely examples, and claimed subject matter is not so limited.

Figure 3:
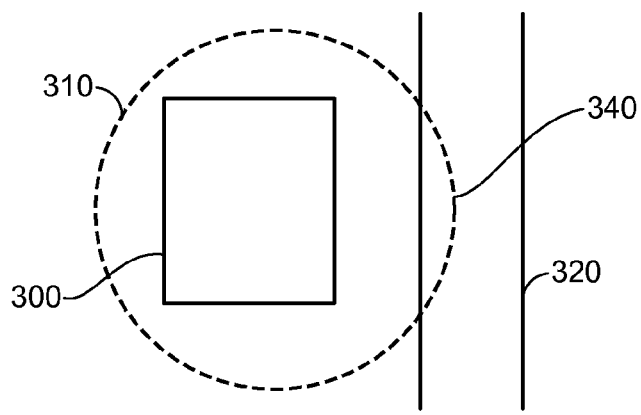
FIG. 3 is a schematic diagram representing a map showing a geophysical entity and an associated geofence, according to an implementation.

FIG. 3 is a schematic diagram representing a map showing a geo-physical entity and an associated geo-fence, according to an implementation. In particular, a residence 300 is located near a geophysical extended feature 320. Herein, "extended feature" is broadly defined, unless indicated otherwise, to mean an entity that presents a boundary or other such demarcation between one region and another region, for example. Such extended features may comprise a hallway, walkway, corridor, alley, tracks, road, street, highway, and/or freeway. An "extended feature" may alternatively comprise a stream, river, shore of a general body of water, fence, and/or property line, just to name a few examples.

Residence 300 may be surrounded by a geofence 310 that includes a portion 340 extending into extended feature 320. Such a portion 340 may present an undesirable location-based tracking situation, wherein a tracked mobile device may be within geofence 310 but in a region that is outside residence 300 and surrounding property. For example, a child being tracked by a location-based service utilizing geofence 310 may determine that the child is within geofence 310 and therefore safely inside residence 300 while, in fact, the child may be in geofence portion 340 and playing in a street, such as extended feature 320. Accordingly, extended feature 320 may present a reason, as well as an opportunity, to modify the shape and/or size of geofence 310, as explained below.

Figure 4:
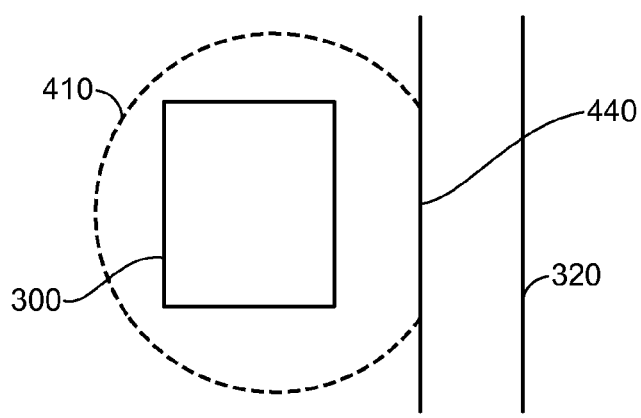
FIG. 4 is a schematic diagram representing a map showing a geophysical entity and an associated geofence, according to another implementation.

FIG. 4 is a schematic diagram representing a map showing a geo-physical entity and an associated geofence, according to another implementation. In particular, residence 300 located near extended feature 320 may be surrounded by a geofence 410 that includes a truncated portion 440 comprising a boundary with extended feature 320. Such a truncated portion 440 may result from a boundary position adjustment of geofence 410 based, at least in part, on position information regarding extended feature 320, as explained below.

Figure 5:
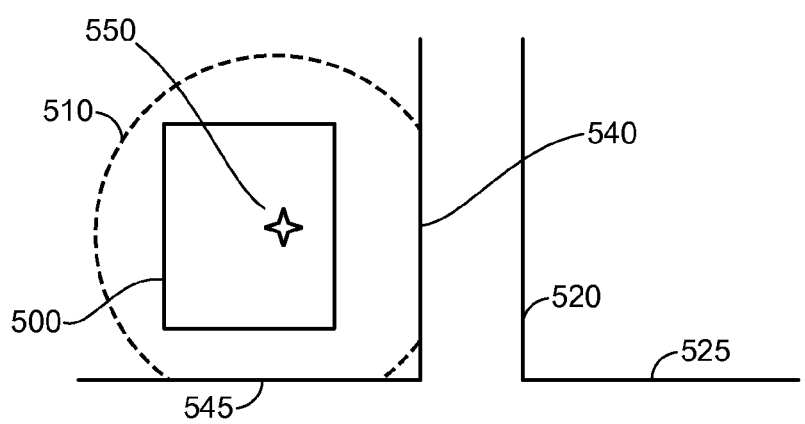
FIG. 5 is a schematic diagram representing a map showing a geophysical entity and an associated geofence, according to still another implementation.

FIG. 5 is a schematic diagram representing a map showing a geo-physical entity and an associated geofence, according to still another implementation. In particular, a residence 500 is located near extended features such as a road 520 and intersecting road 525. Residence 500 may be surrounded by a geofence 510 that includes truncated portions 540 and 545, both comprising boundaries with roads 520 and 525, respectively. Such truncated portions 540 and 545 may result from boundary position adjustments of geofence 510 based, at least in part, on position information regarding roads 520 and 525, as explained below. Of course, a geophysical entity, such as residence 500, may be proximate to any number of extended features, and claimed subject matter is not limited to one or two adjusted portions of a geofence, as illustrated above.

Figure 6:
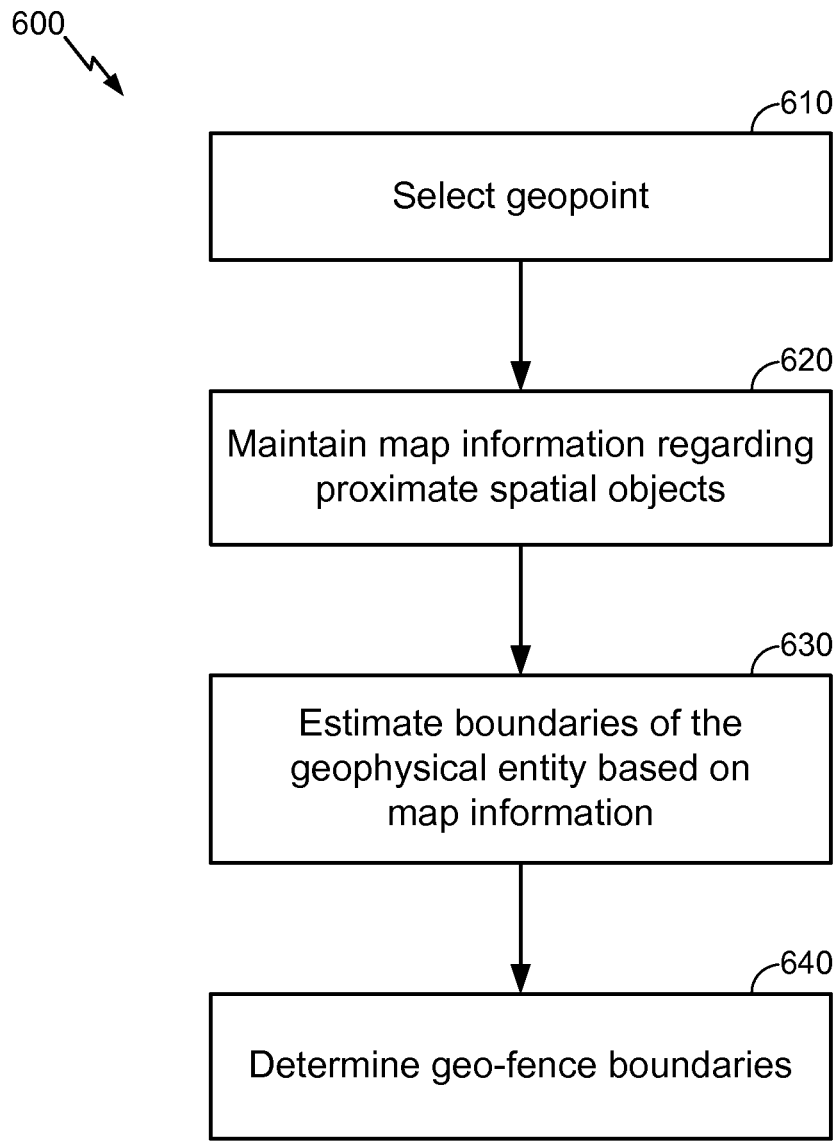
FIG. 6 is a flow diagram of a process for determining a geofence, according to an implementation.

FIG. 6 is a flow diagram of a process 600 for determining a geofence, according to an implementation. Such a process may be implemented, for example, by a mobile device comprising a receiver to receive RF signals and a special purpose computing device adapted to operate in an RF environment. Alternatively, such a process may be implemented, for example, by a land-based device comprising a receiver to receive location information of a mobile device to be tracked, and a special purpose computing device adapted to operate in an RF environment. At block 610, a geopoint may be selected in order to begin a process of establishing a geofence. In one particular implementation, a user may enter an address, map coordinates, and/or other information to identify a particular geophysical entity, such as a residence, hospital, shopping mall, school, and so on, where a selected geopoint is located. At block 620, map information may be maintained in a memory of a mobile device and/or base station, for example. Such map information may be used to identify a selected geopoint by cross-referencing an address with map coordinated, for example. Such map information may also comprise information such as position, orientation, size, shape, and so on, regarding spatial objects proximate to a selected geopoint and corresponding geophysical entity. Such spatial objects may comprise one or more extended features, as defined above, and/or other geophysical entities. For example, referring to FIG. 5, a user may select a geopoint 550 corresponding to a geophysical entity comprising residence 500. In one implementation, a default size and/or shape of geofence may be established to surround geopoint 550. For example, geofence 510 may comprise a circle of a particular diameter centered at geopoint 550. Such a geofence may overlap boundaries of proximate extended features and/or other geophysical entities, as described above. At block 630, boundaries of a geophysical entity may be estimated based, at least in part, on map information described above. For example, returning to FIG. 5, boundaries of residence 500 may include roads 520 and 525. Based, at least in part on such boundaries, geofence boundaries may be determined, as at block 640. For example, if a circular geofence was earlier determined for residence 500, then boundaries of such a circular geofence may be adjusted, such as by truncation, based at least in part, on positions and/or locations of proximate extended features and/or other spatial objects.

Figure 7:
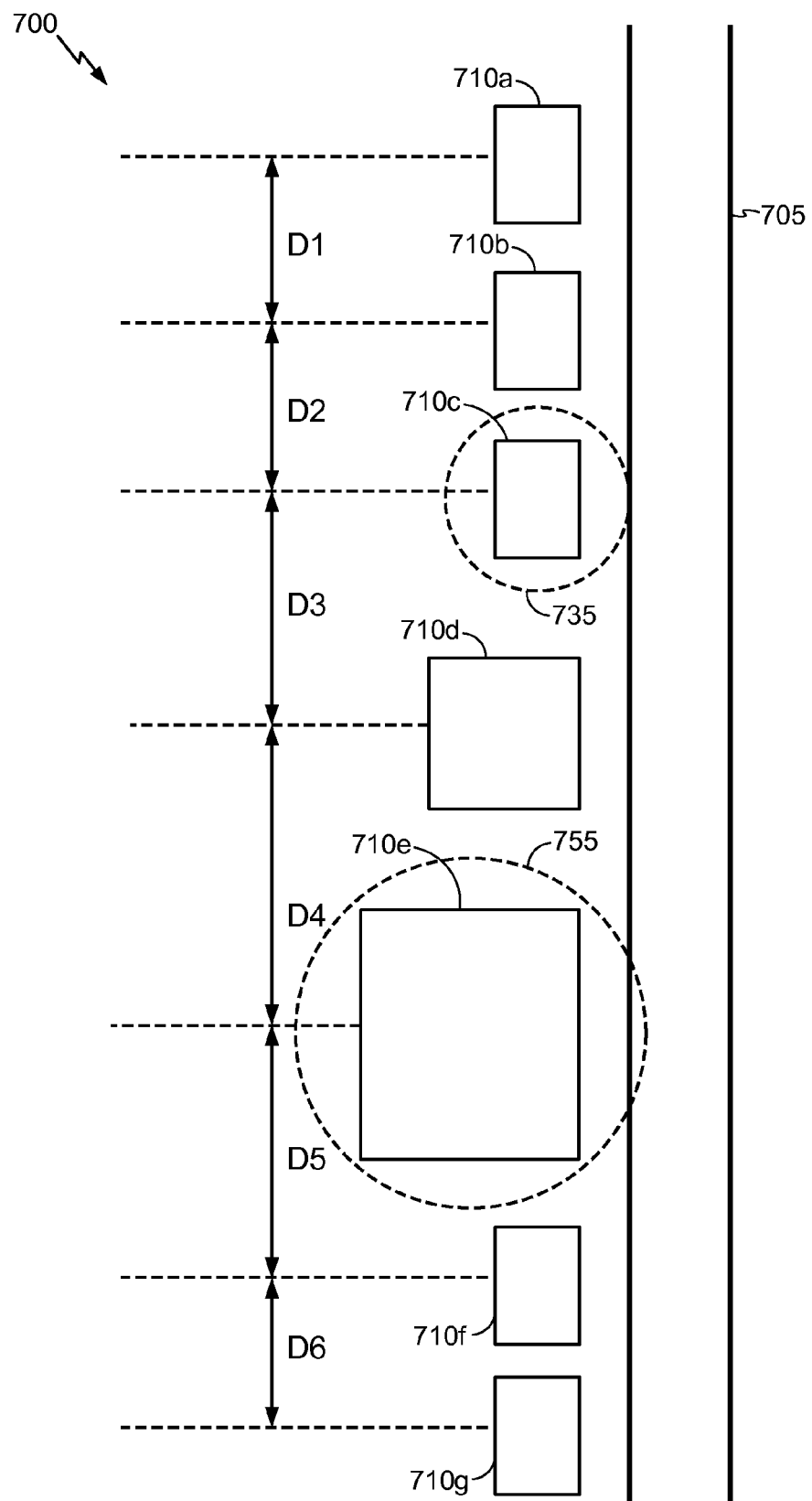
FIG. 7 is a schematic diagram representing a map showing geophysical entities and associated geofences, according to an implementation.

FIG. 7 is a schematic diagram representing a map showing geophysical entities and associated geofences, according to an implementation. In particular, geophysical entities may comprise residences 710a, 710b, 710c, 710d, 710e, 710f, and 710g (hereinafter "710") located on an extended feature, such as street 705. In the following description, "geopoint residence" means a residence that is of particular interest, wherein a geopoint has been established. For example, FIG. 7 shows geopoint residences 710c and 710e having geofences 735 and 755, respectively. Individual residences 710 may be associated with respective addresses and/or map coordinates, such as latitude and longitude. Residences may be separated from one another by various distances, indicated as D1 through D6 in FIG. 7. Such distances may be determined from map information comprising addresses and/or map coordinates of individual residences 710. For example, geopoint residence 710e is separated by distances D4 and D5, respectively, from neighboring residences 710d and 710f. Similarly, geopoint residence 710c is separated by distances D2 and D3, respectively, from neighboring residences 710b and 710d. In a particular implementation, such distances between residences that are adjacent and/or proximate to a geopoint residence may correspond to a size of the geopoint residence. For example, compared to distances D2 and D3, larger distances D4 and D5 correspond to geopoint residence 710e being larger than geopoint residence 710c. Such a process, which will be explained in further detail below, of correlating distances between adjacent residences to sizes of the residences may provide a technique for determining a size of a geofence for the residences. Here, for example, a large geopoint residence may be associated with a relatively large geofence while a small geopoint residence may by associated with a relatively small geofence. Though the example above involves residences, such a description of a process to determine geofence size may as well involve other geophysical entities, such as apartment units, apartment buildings businesses, schools, parks, hospitals, and so on. Claimed subject matter is not limited to any particular geophysical entity nor other details described above.

Figure 8:
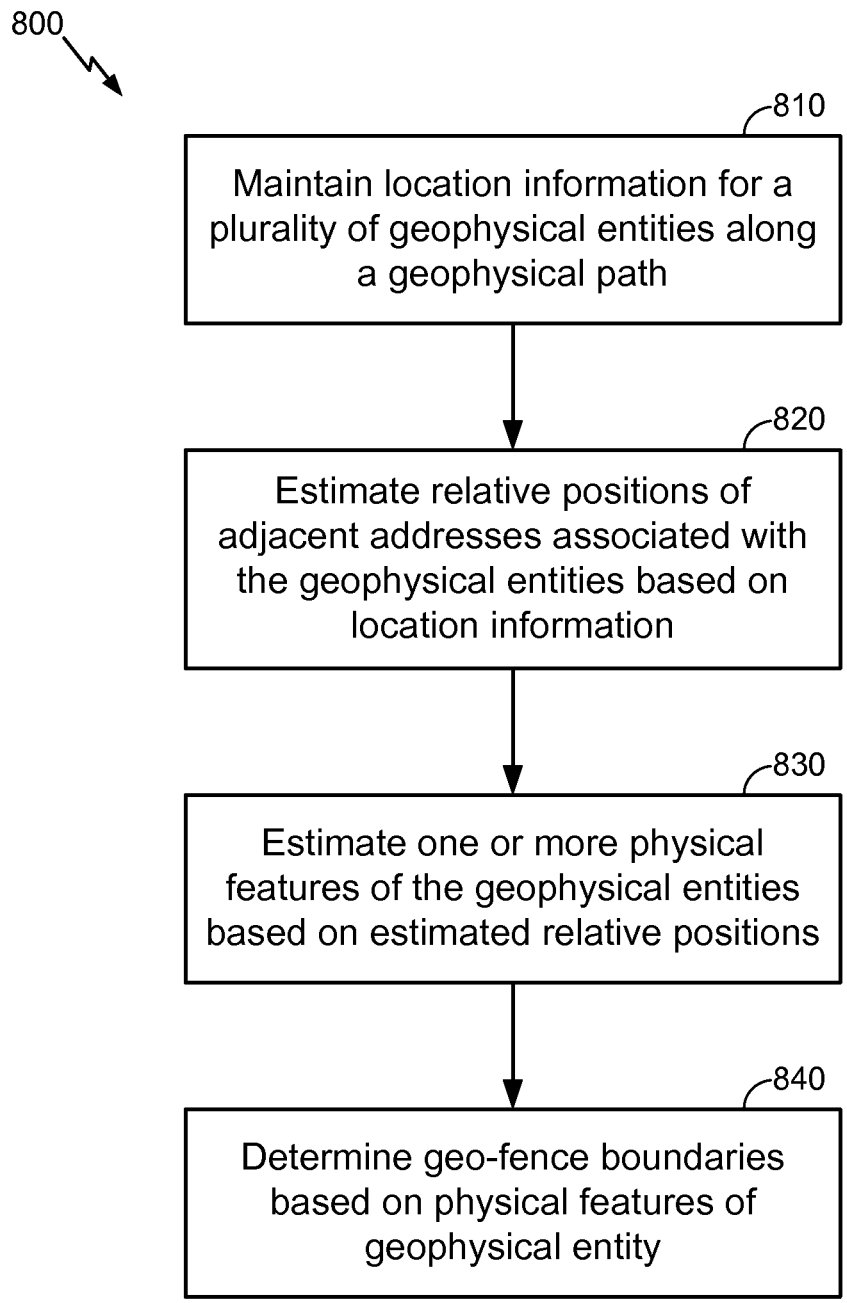
FIG. 8 is a flow diagram of a process for determining a geofence, according to an implementation.

FIG. 8 is a flow diagram of a process 800 for determining a geofence, according to an implementation. At block 810, location information may be stored in a memory at a mobile device and/or a base station, for example. Such location information may comprise map coordinates and/or addresses, for example, of one or more geophysical entities located along an extended feature. For example, location information may comprise map coordinates of a plurality of residences located along a street, such as residences 710 located on street 705. Such location information may associate particular map coordinates with particular street addresses. For example, individual residences 710 may be associated with respective addresses and/or map coordinates, such as latitude and longitude. Accordingly, as described above, relative positions of adjacent addresses of geophysical entities may be estimated based on map coordinates corresponding to street addresses, as at block 820. Physical features, such as size and/or shape, of geophysical entities may then be estimated based, at least in part, on their relative positions, as at block 830. At block 840, boundaries of a geofence for a particular geophysical entity may be determined based, at least in part, on estimated physical features of the geophysical entity. Of course, such a description of process 800 is merely an example, and claimed subject matter is not so limited.

Figure 9:
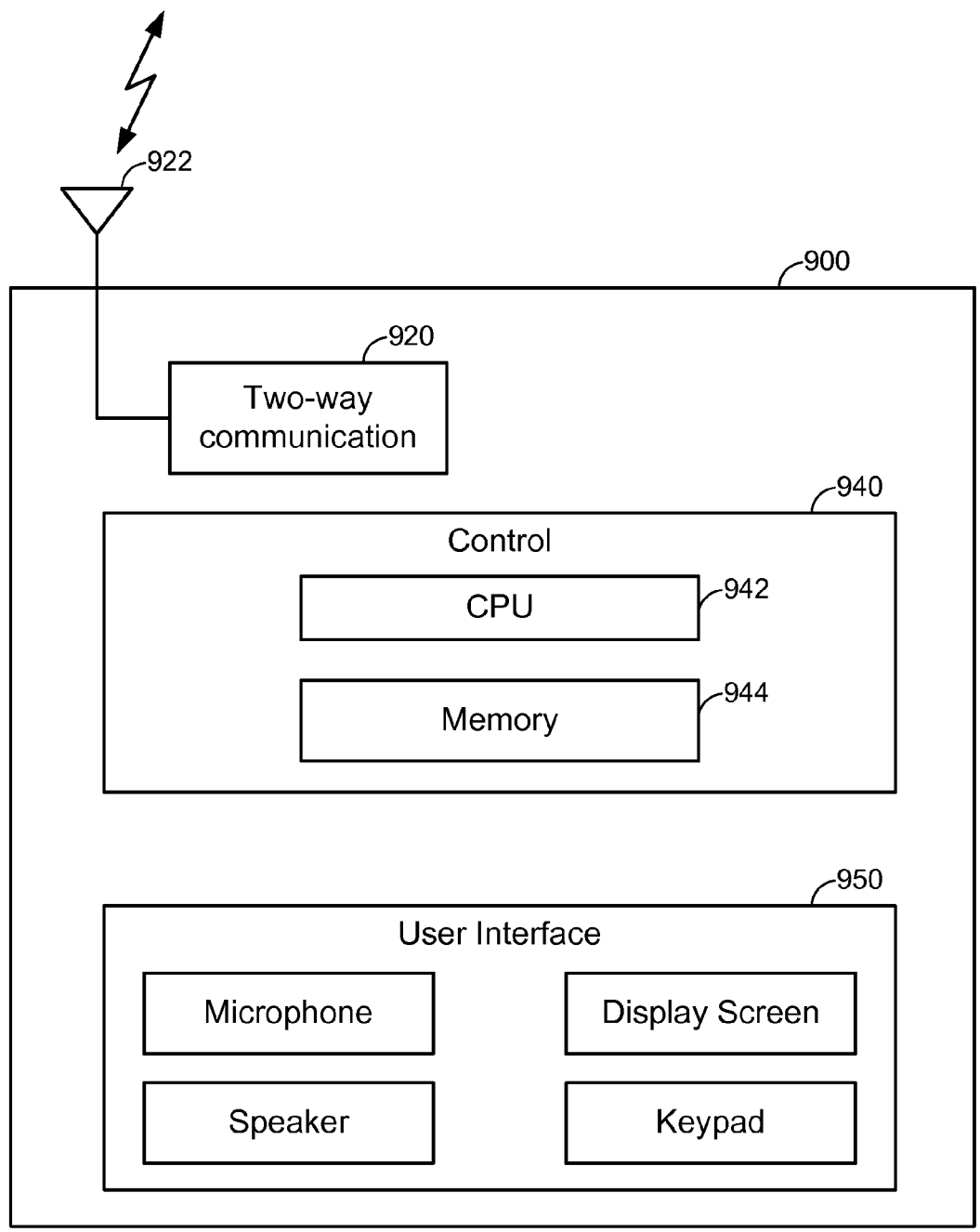
FIG. 9 is a schematic diagram of a device capable of communication with a wireless network and executing code to determine geofences, according to one implementation.

FIG. 9 is a schematic diagram of a device 900 capable of communication with a network, according to one implementation. Such a network may be wireless, for example. Such a device may include a mobile device used for establishing geopoints and/or determining geofences, as described above for example. In the case of a wireless, mobile device, device 900 may include a two-way communication system 920, such as but not limited to a cellular communication system, which may transmit and receive signals via antenna 922. The communication system 920 may include a modem adapted to process information for communication in one or more of the aforementioned networks. In one alternative implementation, device 900 may include a position location system, such as an SPS receiver to receive SPS signals. The modem and SPS receiver may communicate with one another, and such communication may include, for example, the cellular identification of the device, estimates of time and/or location, frequency, or other radio information. In another implementation, device 900 may not include a position location system, so that the device lacks any inherent ability to acquire SPS signals.

Control 940 may comprise a special purpose computing platform or device, such as a central processing unit (CPU) 942 and associated memory 944, hardware, software, and firmware. It will be understood as used herein that the CPU 942 can, but need not necessarily include, one or more microprocessors, embedded processors, controllers, application specific integrated circuits (ASICs), digital signal processors (DSPs), and the like. The term CPU is intended to describe the functions implemented by the system rather than specific hardware. In an alternative implementation memory 944 may include a look-up table, as discussed above. Memory 944 may store electronic signals that represent machine-readable instructions which, if executed by CPU 942, may enable device 900 to determine its location, as in at least the implementations described above. Such machine-readable instructions may be downloaded, e.g., received via two-way communication 920, from a remote entity such as a wireless carrier, for example. Machine-readable instructions may include an application that allows device 900 to identify and extract identification information of a cellular base station included in a pilot signal. Such an application may also include a look-up table of cellular base station information for a region or the world. Machine-readable instructions may also include a Kalman filter, as described above. Of course, claimed subject matter is not limited to these examples, which are only described here to help illustrate various implementations.

According to an implementation, one or more portions of memory 944 may store signals representative of data and/or information as expressed by a particular state of memory 944. For example, an electronic signal representative of data and/or information may be "stored" in a portion of memory device by affecting or changing the state of such portions of memory 944 to represent data and/or information as binary information (e.g., ones and zeros). As such, in a particular implementation, such a change of state of the portion of memory to store a signal representative of data and/or information constitutes a transformation of memory 944 to a different state or thing. Memory 944 may comprise one or more types of storage media identified above. A user interface 950 may allow a user to enter information into and receive information, such as voice or data, from device 900. The user interface 950 may include, for example, a keypad, a display screen, a microphone, and a speaker.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory 944 of a mobile device, and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Some portions of the detailed description above are presented in terms of algorithms or symbolic representations of operations on binary digital signals stored within a memory, such as memory 944, of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Position determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Such position determination techniques described herein may also be used for any combination of WWAN, WLAN, and/or WPAN.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    processing a first data record on a special purpose computing device to maintain electronic records representative of information regarding a plurality of geophysical entity categories in a memory;
    processing a second data record on said special purpose computing device to approximate one or more physical features of a geophysical entity among said geophysical entity categories;
    processing said first and second data records on said special purpose computing device to determine boundaries of a geo-fence based, at least in part, on said physical features of said geophysical entity when marked at a location to be maintained by the special purpose computing device; and
    processing said first and second data records on said special purpose computing device to select a particular category from among said geophysical entity categories associated with said geophysical entity, wherein said approximating is based, at least in part, on said particular category, and further wherein selecting the particular category is based on at least one map attribute; and
    processing said first and second data records on said special purpose computing device to refine a geo-fence to exclude from the geo-fence areas overlapping an extended feature.

2. The method of claim 1, wherein said processing said first and second data records on said special purpose computing device to select said particular category is based, at least in part, on one or more attributes of a map.

3. The method of claim 1, wherein said geophysical entity categories are associated with at least one of a single family home, grade school, hospital, and/or construction zone.

4. The method of claim 1, further comprising:
    maintaining electronic records in a memory representative of map information regarding spatial objects proximate to said geophysical entity;
    processing the electronic records on said special purpose computing device to approximate boundaries of said geophysical entity based, at least in part, on said map information.

5. The method of claim 4, wherein said map information comprises location and/or direction of an extended feature, an alley, a road, a highway, a freeway, and/or a body of water.

6. The method of claim 1, further comprising:
    maintaining electronic records in a memory representative of information regarding locations of a plurality of geophysical entities that are along a geophysical extended feature that includes said geophysical entity;
    processing said electronic records on said special purpose computing device to approximate relative positions of adjacent addresses based, at least in part, on said locations.

7. The method of claim 1, wherein said one or more physical features of said geophysical entity comprise one or more boundaries of said geophysical entity.

8. The method of claim 1, further comprising: receiving information regarding at least one geophysical entity category among said plurality of geophysical entity categories from a user.

9. The method of claim 8, further comprising: structuring and/or validating said information from said user.

10. An apparatus comprising:
    means for approximating one or more physical features of a geophysical entity marked at a location, wherein the location is embodied in an electronic record maintained by a special purpose computing device, and wherein a data record is processed by said special purpose computing device to approximate said physical features;
    means for maintaining information regarding a plurality of geophysical entity categories;
    means for determining boundaries of a geo-fence based, at least in part, on said physical features of said geophysical entity at said location, wherein the means for determining boundaries of the geo-fence excludes from the geo-fence areas overlapping an extended feature; and
    means for selecting a particular category from among said geophysical entity categories associated with said geophysical entity, wherein said approximating is based, at least in part, on said particular category, and further wherein selecting the particular category is based on at least one map attribute.

11. The apparatus of claim 10, wherein said selecting said particular category is based, at least in part, on one or more attributes of a map.

12. The apparatus of claim 10, wherein said geophysical entity categories are associated with at least one of a single family home, grade school, hospital, and/or construction zone.

13. The apparatus of claim 12, wherein said map information comprises location and/or direction of an extended feature, an alley, a road, a highway, a freeway, and/or a body of water.

14. The apparatus of claim 10, wherein said approximating one or more physical features further comprises:
    means for maintaining a map of information regarding spatial objects proximate to said geophysical entity;
    means for approximating boundaries of said geophysical entity based, at least in part, on said map information.

15. The apparatus of claim 10, wherein said approximating said one or more physical features further comprises:
    means for maintaining information regarding locations of a plurality of geophysical entities that are along a geophysical extended feature that includes said geophysical entity;
    means for approximating relative positions of adjacent addresses based, at least in part, on said locations.

16. The apparatus of claim 10, wherein said one or more physical features of said geophysical entity comprise one or more boundaries of said geophysical entity at said location.

17. An article comprising a storage medium comprising machine-readable instructions stored thereon which, if executed by a special purpose computing device, are adapted to enable said computing device to:
approximate one or more physical features of a geophysical entity;
maintain electronic records representative of information regarding a plurality of geophysical entity categories in a memory;
determine boundaries of a geo-fence based, at least in part, on said physical features of said geophysical entity when marked at a location, wherein the location is embodied in a data record maintained by the special purpose computing device, wherein the boundaries of the geo-fence exclude from the geo-fence areas overlapping an extended feature; and
select a particular category from among said geophysical entity categories associated with said geophysical entity, wherein said approximating is based, at least in part, on said particular category, and further wherein selecting the particular category is based on at least one map attribute.

18. The article of claim 17, wherein said machine-readable instructions, if executed by the computing platform, are further adapted to enable said special purpose computing device to select said particular category based, at least in part, on one or more attributes of a map of information.

19. The article of claim 17, wherein said geophysical entity categories are associated with at least one of a single family home, grade school, hospital, and/or construction zone.

20. The article of claim 19, wherein said map information comprises location and/or direction of an extended feature, an alley, a road, a highway, a freeway, and/or a body of water.

21. The article of claim 17, wherein said machine-readable instructions, if executed by a computing platform, are further adapted to enable said special purpose computing device to:
maintain in a memory a map of information regarding spatial objects proximate to said geophysical entity;
approximate boundaries of said geophysical entity based, at least in part, on said map information.

22. The article of claim 17, wherein said machine-readable instructions, if executed by a computing platform, are further adapted to enable said special purpose computing device to:
maintain in a memory information regarding locations of a plurality of geophysical entities that are along a geophysical extended feature that includes said geophysical entity;
approximate relative positions of adjacent addresses based, at least in part, on said locations.

23. The article of claim 17, wherein said one or more physical features of said geophysical entity comprise one or more boundaries of said geophysical entity.

24. A mobile device comprising:
a receiver to receive RF signals; and
a special purpose computing device coupled to the receiver adapted to operate in an RF environment to:
approximate one or more physical features by maintaining information regarding a plurality of geophysical entity categories in a memory;
selecting a particular category from among said geophysical entity categories associated with said geophysical entity, wherein said approximating is based, at least in part, on said particular category, and further wherein selecting the particular category is based on at least one map attribute;
approximate one or more physical features of a geophysical entity marked at a location, wherein the location is embodied in an electronic record maintained by the special purpose computing device, and wherein a data record is processed by said special purpose computing device to approximate said physical features; and
determine boundaries of a geo-fence based, at least in part, on said physical features of said geophysical entity at said location, wherein the boundaries of the geo-fence exclude areas overlapping an extended feature.

25. The mobile device of claim 24, wherein said selecting said particular category is based, at least in part, on one or more attributes of a map.

26. The mobile device of claim 24, wherein said geophysical entity categories are associated with at least one of a single family home, grade school, hospital, and/or construction zone.

27. The mobile device of claim 24, wherein said special purpose computing device is further adapted to operate in an RF environment to:
approximate one or more physical features by maintaining a map of information in a memory regarding spatial objects proximate to said geophysical entity, and by approximating boundaries of said geophysical entity based, at least in part, on said map information.

28. The mobile device of claim 27, wherein said map information comprises location and/or direction of an extended feature, an alley, a road, a highway, a freeway, and/or a body of water.

29. The mobile device of claim 24, wherein said special purpose computing device is further adapted to operate in an RF environment to:
approximate said one or more physical features by maintaining in a memory information regarding locations of a plurality of geophysical entities that are along a geophysical extended feature that includes said geophysical entity, and by approximating relative positions of adjacent addresses based, at least in part, on said locations.

30. The mobile device of claim 24, wherein said one or more physical features of said geophysical entity comprise one or more boundaries of said geophysical entity.

31. A device comprising:
a receiver to receive location information regarding a mobile device; and
a special purpose computing device adapted to:
approximate one or more physical features by maintaining information regarding a plurality of geophysical entity categories in a memory, and by selecting a particular category from among said geophysical entity categories associated with said geophysical entity, wherein said approximating is based, at least in part, on said particular category, and further wherein selecting the particular category is based on at least one map attribute;
approximate one or more physical features of a geophysical entity marked at a location, wherein the location is embodied in an electronic record maintained by said special purpose computing device, and wherein a data record is processed by said special purpose computing device to approximate said physical features; and
determine boundaries of a geo-fence based, at least in part, on said physical features of said geophysical entity at said location, wherein the boundaries of the geo-fence exclude areas overlapping an extended feature.

32. The device of claim 31, wherein said selecting said particular category is based, at least in part, on one or more attributes of a map.

33. The device of claim 31, wherein said geophysical entity categories are associated with at least one of a single family home, grade school, hospital, and/or construction zone.

34. The device of claim 31, wherein said special purpose computing device is further adapted to:
- approximate one or more physical features by maintaining a map including information in a memory regarding spatial objects proximate to said geophysical entity, and by approximating boundaries of said geophysical entity based, at least in part, on said map information.

35. The device of claim 34, wherein said map information comprises location and/or direction of an extended feature, an alley, a road, a highway, a freeway, and/or a body of water.

36. The device of claim 31, wherein said special purpose computing device is further adapted to:
- approximate said one or more physical features by maintaining in a memory information regarding locations of a plurality of geophysical entities that are along a geophysical extended feature that includes said geophysical entity, and by approximating relative positions of adjacent addresses based, at least in part, on said locations.

37. The device of claim 31, wherein said one or more physical features of said geophysical entity comprise one or more boundaries of said geophysical entity.

* * * * *